(12) United States Patent
Paepcke et al.

(10) Patent No.: US 11,607,813 B2
(45) Date of Patent: Mar. 21, 2023

(54) SYSTEMS AND METHODS FOR UNDER-STAIR STORAGE AND RETRIEVAL

(71) Applicant: Toyota Research Institute, Inc., Los Altos, CA (US)

(72) Inventors: Stephanie Paepcke, Mountain View, CA (US); Katherine Tsui, Watertown, MA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 257 days.

(21) Appl. No.: 17/159,580

(22) Filed: Jan. 27, 2021

(65) Prior Publication Data

US 2022/0234203 A1     Jul. 28, 2022

(51) Int. Cl.
| | |
|---|---|
| *B25J 9/00* | (2006.01) |
| *B25J 9/16* | (2006.01) |
| *B25J 5/02* | (2006.01) |
| *B25J 19/00* | (2006.01) |

(52) U.S. Cl.
CPC .............. *B25J 9/1679* (2013.01); *B25J 5/02* (2013.01); *B25J 9/161* (2013.01); *B25J 9/1653* (2013.01); *B25J 9/1697* (2013.01); *B25J 19/005* (2013.01)

(58) Field of Classification Search
CPC ... B25J 9/1679; B25J 5/02; B25J 9/161; B25J 9/1653; B25J 9/1697; B25J 19/005
See application file for complete search history.

(56) References Cited

U.S. PATENT DOCUMENTS

| | | | | |
|---|---|---|---|---|
| 5,148,573 | A | * | 9/1992 | Killian ...................... A47L 9/00 901/41 |
| 2020/0043489 | A1 | | 2/2020 | Bradley et al. |
| 2020/0123780 | A1 | | 4/2020 | Harrison |

FOREIGN PATENT DOCUMENTS

| | | |
|---|---|---|
| CN | 2747206 Y | 12/2005 |
| JP | 2567569 Y2 | 4/1998 |
| JP | H10238053 A | 9/1998 |
| KR | 102008367 B1 | 8/2019 |
| WO | 2020081650 A1 | 4/2002 |

OTHER PUBLICATIONS

Damperdown House (https://www.houzz.in/photos/camperdown-house-phvw-vp~6993354 Oct. 2, 2020.
Seated stairlifts (https://www.dlf.org.uk/factsheets/stairs) Oct. 2, 2020.

* cited by examiner

*Primary Examiner* — Ian Jen
(74) *Attorney, Agent, or Firm* — Dinsmore & Shohl LLP (57) ABSTRACT

Systems and methods for under-stair storage include a robotic retrieval system. The robotic retrieval system includes a robot that retrieves and deposits objects in a space under a set of stairs, A portal provides access to the space from above the stairs. Objects are stored in locations within the space. The robot selectively locates and retrieves the objects.

20 Claims, 6 Drawing Sheets

SYSTEMS AND METHODS FOR UNDER-STAIR STORAGE AND RETRIEVAL

TECHNICAL FIELD

The present specification relates to systems and methods for under-stair storage and retrieval of objects and more particularly, to systems and methods for controlling a robotic retrieval system to for under-stair storage and retrieval of objects.

BACKGROUND

Facilities like houses and apartments have limited space for storage of objects. This may be particularly true in urban settings where size of living spaces may be especially limited. Traditionally, people have rented storage space outside of their living space. Often, people may store objects vertically, such as in high and hard to reach places. Storing objects in high and hard to reach places may be inefficient and may also present challenges. For instance, many elderly persons may be at serious risk of falling and suffering harm when reaching for objects stored in high spaces. In other examples, people may utilize hooks or other tools to move objects stored in high spaces. Yet these hooks may cause their own hazards.

Accordingly, there is a need for systems and methods for increasing storage space. It is desirable to provide efficient and effective systems and methods for storage and retrieval of objects.

SUMMARY

Described herein is a system for under-stair storage. The system may include a portal comprising a platform configured to receive one or more objects, wherein the portal operatively provides access to a space defined under a set of stairs; a robotic retrieval system comprising a robot, wherein the robot includes an arm for grasping the one or more objects, and wherein the robot is configured to: retrieve the one or more objects from one or more locations within the space; deposit the one or more objects in the one or more locations within the space; in response to user input requesting storage of a target object from the one or more objects, determine a target location in which to deposit the target object; and store the target location and an identifier that identifies the target object in memory. The robotic retrieval system may further include a track disposed under the set of stairs, wherein the robot operatively transverses the track to retrieve or deposit the one or more objects. The robotic retrieval system may further include a track disposed above the set of stairs, wherein the robot operatively transverses the track to retrieve or deposit the one or more objects. The robot may include at least one image capturing device that operatively determines an identification of the one or more objects based on at least one of an image of the one or more objects or an identification token located on the one or more objects. In some examples, the robotic retrieval system may determine whether to retrieve an object from the one or more objects in response to a user request. The robotic retrieval system may determine whether to retrieve an object from the one or more objects in response to a triggering event. In another example, the robotic retrieval system may determine the target location in which to deposit the target object based at least in part on dimensions of the target object and dimensions of the target location. The robotic retrieval system may further determine determines the target location in which to deposit the target object based further in part on dimensions of one or more pathways formed within the space. In another example, the robotic retrieval system may determine the target location in which to deposit the target object based at least in part on a frequency of retrieval and storage of the target object and proximity of the target location to the portal. The robotic retrieval system may further include at least one display device that generates notifications identifying the one or more objects stored within the space. The robotic retrieval system may further include a charging station, and wherein the robot includes a rechargeable battery that is operatively recharged by the charging station.

Further described is a method that may include receiving an object at a portal for storage under a set of stairs; determining a target location in a space defined below the set of stairs in which to store the object; grasping, by a robotic retrieval system, the object from the portal; delivering the object to the target location in the space. The method may include receiving user input requesting retrieval of the object; and in response to the user input, retrieving the object from the target location. In another aspect, the method may include detecting a triggering event; and in response to detecting the triggering event, retrieving the object from the target location. The triggering event may include at least one of a weather parameter meeting a criteria, an event, a holiday, or an alarm. The method may further include calculating a probability of that a user will request retrieval of the object based on a weighted model of a history associated with the user; and in response to the probability meeting a threshold probability, retrieving the object from the target location.

Also described is a system for under-stair storage that may include a portal comprising a platform configured to receive one or more objects; a robotic retrieval system comprising a track disposed beneath a set of stairs, and a robot operatively connected to the track and configured to traverse the track to retrieve or deposit one or more objects within a space below the set of stairs, and wherein the robot includes an arm for moving the one or more objects in desired locations. The set of stairs may include one or more of horizontal surfaces and one or more of vertical surfaces, and wherein the one or more horizontal surfaces are movable to raise or lower an object onto an adjacent one or more horizontal surface. The one or more vertical surfaces may be movable to open or close to allow access to the space or allow the one or more horizontal surfaces to move raise or lower. The portal may include a lifting mechanism and a platform configured to receive an object.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments of the present disclosure are directed to an under-stair storage system that increase the storage space of a living space. The under-stair storage system may include a robotic retrieval system that retrieves and returns objects stored in a space beneath a stair surface. A track may be disposed within the space wither above or below the stair surface. A robot may be secured to the track and may be operable to move along the tack. Access to the space may be provided by a portal.

In embodiments, a user's objects are stored at various locations within the space. The system keeps track of where the objects are located within the space. When a user wants a particular object, the user tells the robot (e.g., by voice command, by input into a computing device, and the like) which object is needed. The robot navigates on the track and locates the object and grasps the object. The stair surface may open to provide access to the object. In other embodiments, the robot may be disposed underneath the stair surface and may deliver the object to a portal. In some embodiments, the system also includes a lift that lifts the object from the platform so that the user does not need to bend down to pick the object up. The user may program the system so that certain objects are preemptively fetched on certain days or times of the year (e.g., cold weather object s are delivered at the start of winter). The system may also display what and where objects are located within the storage space.

Figure 1:
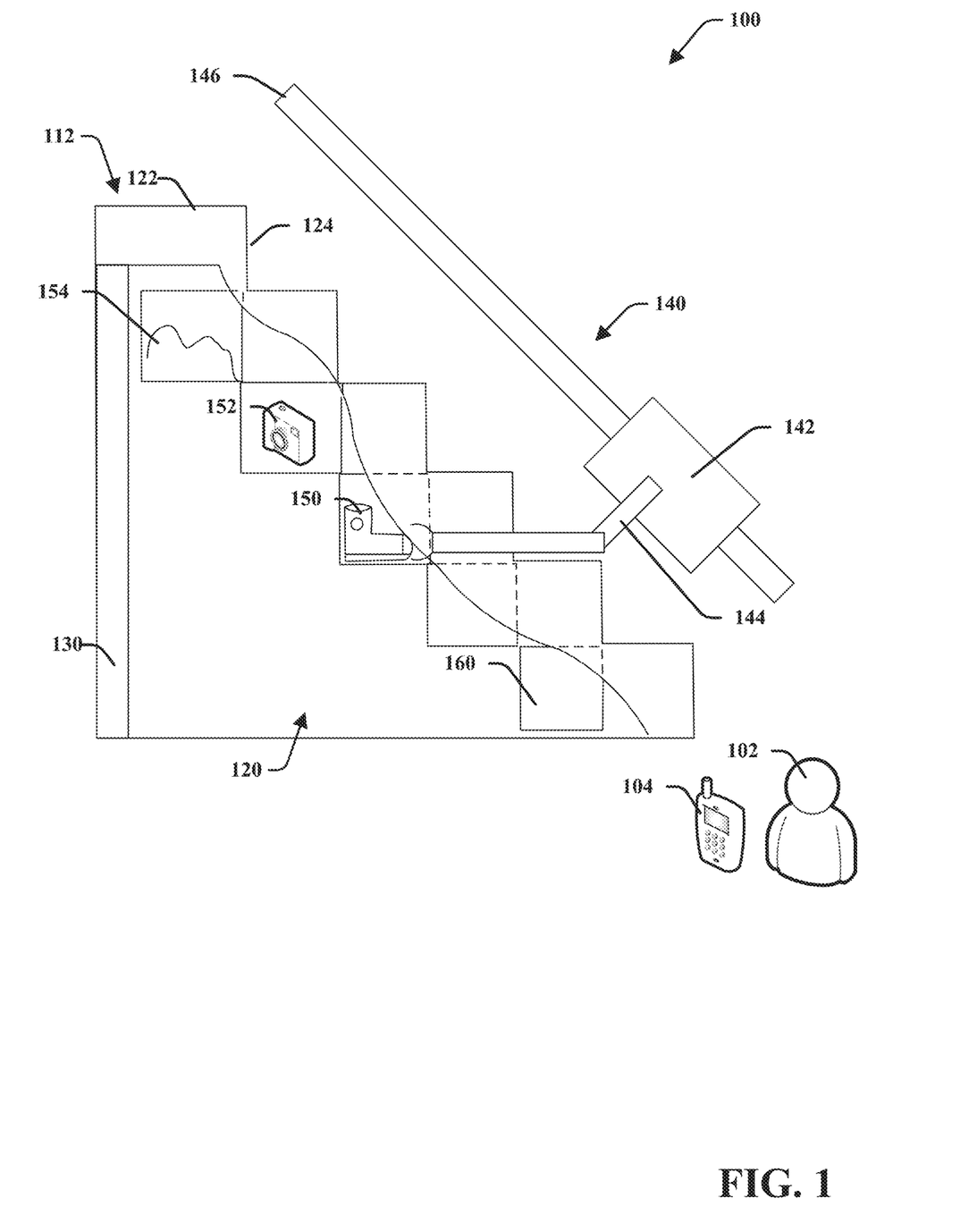
FIG. 1 depicts an under-stair storage system according to one or more embodiments described and illustrated herein.

Referring now to FIG. 1, an under-stair storage system 100 is illustrated. The under-stair storage system 100 may include a robotic retrieval system 140 that may operatively retrieve or store objects from a space 120. The space 120 may be defined by a set of stairs or stairs 112. The stairs 112 may include one or more horizontal surfaces 122 and one or more vertical surfaces 124. Objects may be received at a portal within the stairs 112 or at another desired location. It is noted that the stairs 112 may include one or more materials, such as wood or wood composites, fabric (e.g., carpet, etc.) laminate, ceramic, metal, concrete, metal, glass, or other materials. For example, horizontal surfaces 122 may include a subfloor layer comprising a wood composite and a surface layer comprising a laminate tile. It is further noted that some embodiments may not utilize the one or more vertical surfaces 124, such as in floating stair constructions. In such instances, the one or more vertical surfaces 124 may not be present.

Within the space 120, there may be a plurality of support structures 130. The support structures may comprise joists, girders, frames, beams, or the like. It is noted that the arrangement and construction of the support structures 130 may vary between embodiments, such as may be required by jurisdictional building codes. It is further noted that embodiments may utilize existing or newly constructed facilities (e.g., homes, apartment buildings, etc.). As such, embodiments may be adapted to various arrangements and constructions of the support structures 130.

In embodiments, the robotic retrieval system 140 may include a robot 142 that may travel on a track 146. The robot 142 may include an arm 144. The arm 144 may include at least one grasping appendage, such as a hook, clasp, claw, gripping portion, suction device, magnet, or the like. For instance, the arm 144 may include a suction device to apply suction to an object or bin and manipulate the position of the object or bin. In another example, the arm 144 may include a claw having one or more lingers. The claw may be operable and closeable to release or grasp an object as desired. According to another aspect, the arm 144 may be translatable about an axis, such as a telescoping, or otherwise moving towards or away from an object.

It is further noted that robot 142 may comprise or otherwise be communicatively coupled with a computing device that may comprise hardware and/or software (e.g., program threads, processes, computer processors, non-transitory memory devices, etc.). In some examples, the robot 142 may communicatively coupled with an external computing device, such as a personal computing device, server computing device, mobile computing device, smart phone, tablet computer, wearable device, set top box, or the like. It is noted that computing device may perform some or all functions described herein. Additionally, under-stair storage system 100 may include a plurality of computers, servers, databases, or other devices communicatively coupled together. Computing devices may comprise a non-transitory computer-readable medium and may communicate via networks embodied as hardware, software, and/or firmware, according to embodiments shown and described herein, in embodiments, the computing devices may include hardware, software, and/or firmware. In at least some embodiments, the computing devices may be configured as a special purpose computer designed specifically for performing the functionality described herein.

It is noted that the robot 142 may include one or more motors, which may be controlled by a processor. For instance, a motor may drive the robot 142 about the track 146 through rotating members (e.g., wheels, sprockets, etc.). The motor may be disposed within the robot 142 or may be located external to the robot 142 while the robot 142 is pulled or pushed through cables, chains, belts, or the like. The track 146 may comprise metal, wood, plastic, or other material attached to a support structure 130. In an aspect, the track 146 may be C-shaped or otherwise shaped to allow the robot 142 to traverse the track 146. In embodiments, the robot 142 may be powered by a power source (e.g., power mains, a battery, or the like). The robot 142 may include a solenoid that may, be powered by the power source. Rotation of the solenoid may be monitored to determine the location of the robot 142, distance traveled, or the like. It is noted that the robot 142 may include other devices to identify its location, distanced traveled, or the like. For instance the robot 142 may include an accelerometer or other motion sensing device that may allow the robot 142 to track its movement and identify its location. In at least some embodiments, the track 146 may include position indicators, such as wireless tags, indicia or identification tokens (e.g., 21) barcodes, 3D barcodes, etc.), physical formations, or the like that may be read by the robot 142 to indicate a position of the robot 142. It is further noted that the track 146 may provide power to the robot 142 and/or provide an access line to power for other portions of a structure, such as to power outlets positioned above the horizontal surface 122.

In at least some embodiments, the robot 142 may include sensors, image capturing devices, wireless signal transceivers/receivers, or the like. The robot 142 may identify objects based on image recognition, scanning of a bar code, detection of wireless signals (e.g., near field correspondence or "NFC" device, MD device, or other devices), or the like. In an example, objects 150, 152 may be equipped with a wireless tag attached to the object. The robot 142 may utilize a wireless receiver to receive a signal elicited from the wireless tag. The signal may contain an identifier token or "ID" that may be associated to one of objects 150, 152.

Objects 150, 152 may include any object that is appropriately sized to fit within the space 120. It is noted that the number and placement of objects may vary and that four objects are shown generally equally spaced apart for simplicity of explanation. As described herein, objects 150, 152 may be positioned on shelves 160. The shelves 160 may be attached to the stairs 112, support structures 130, or the like. In some examples, objects 150, 152, may be disposed in bins, such as containers, platforms, baskets, tubes, boxes, or other surfaces that may receive objects. It is noted that bins may include grasping surfaces, magnets, or the like to enable the arm 144 to grasp and release the bins. Depending on the size of the bins and the size of the space 120, embodiments may include an appropriate number of bins.

In some embodiments, the robot 142 may store coordinates that map to locations within the space 120. For instance, the robot 142 may include a memory device that may store coordinate information, such as in a Cartesian plane. The robot 142 may utilize the coordinates to track, locate, or place objects. For instance, when the robot 142 receives an object to be placed in the space 120, the robot 142 may identify a coordinate location to place the object. The coordinate location may be specified by a user, selected based on usage and time of retrieval (e.g., objects used more often may be located such that the retrieval time is lower), selected based on a first in-first out or last in-last out process, or the like. The robot 142 may store the selected location in the memory device, transmit the location to a remote memory device (e.g., a user device, server, etc.), or the like. It is noted, that robot 142 may utilize other appropriate methodologies to track, locate, or place objects, such as image recognition, wireless identification, or the like.

A user 102 may control or otherwise provide instructions to the robot 142. The instructions may cause the robot 142 to store, retrieve, mover, or otherwise interact with objects. In some examples, the instructions may allow a user 102 to manually control the robot 142. The user may utilize a control panel or a user device 104 (e.g., smart phone, tablet computer, laptop computer, desktop computer, digital home assistant with voice control operation, wearable device, etc.) to interface with the robot 142 and transmit communications to and from the robot 142. In examples, the communications may be wirelessly transmitted or transmitted via a wired connection.

In embodiments, a user may provide input to a user device to identify an object to be stored. For instance, the user may identify an object as "rain coat." The user device may instruct the robot 142 to retrieve the device through a portal. The portal may include a door formed in or on the horizontal surfaces 122 and/or vertical surfaces 124, a chute (e.g., lazy waiter), or the like. In some examples, the portal may be located within a cabinet, wall, closet, furniture, or the like. The user may place the object in or on the portal and the object may be retrieved by the robot 142. In some examples, the object may be placed in a bin that is then retrieved by the robot 142. As another example, the object or bin may be moved into the space 120 and the robot 142 may then retrieve the object or bin. Once the robot 142 retrieves the object or bin, the robot 142 may carry the object or bin to a desired location and may deposit the object or bin in the desired location. The robot 142 may confirm the placement of the object or bin. In some embodiments, the robot 142 may include an image capturing device to capture an image of the object or bin and transmit the image to the user, such as through the user device.

The robot 142 may similarly retrieve objects or bins stored within the space 120. For instance, the user may identify an object or bin to be retrieved. The robot 142 may navigate to the object or bin, and retrieve the object or bin. The robot 142 may then deliver the object or bin to the user, such as through a portal. In some instances, the robot 142 may re-order or re-locate objects or bins in the space 120, such as based on a user command or based on a predictive algorithm.

Additionally or alternative, the robot 142 may retrieve objects, reorder objects, or perform other tasks based on a schedule, triggering events, machine learning or artificial intelligence, and the like. In an example, a user may define a schedule in which the robot 142 retrieves stored objects. The user may desire to store an object at the end of a work week and retrieve the object at the start of the work week. For instance, the object may comprise a brief case. The user may instruct the robot 142 to store the brief case every Friday. The user may additionally set a schedule so that the robot 142 retrieves the brief case automatically on every Monday. Thus, the user's brief case may be delivered to a portal per the schedule without the user having to issue a command as they prepare for work.

In some embodiments, the robot 142 may proactively retrieve objects based on triggering events, machine learning, predictive algorithms, or the like. For instance, the robot 142 may monitor for triggering events and in response to a triggering event, the robot 142 may retrieve one or more objects. A triggering event may be a weather parameter (e.g., temperature threshold, precipitation forecast, allergen count, air quality metric, etc.), event, holiday, an alarm (e.g., smoke detector, gas detector, doorbell, etc.), or the like. As an example, the robot 142 may identify a weather forecast calls for rain with a certain degree of probability, the robot 142 may retrieve rain gear from the space 120 without being prompted by the user.

In other examples, the robot 142 may identify patterns of user behavior and predict the likelihood that a user desires a stored object at a given time. The robot 142 may utilize deep learning (recurring neural networks, convolution engines, or other). For instance, embodiments may utilize artificial intelligence, statistical models, or other processes and/or algorithms. As an example, classifiers may be mapped to an attribute vector to a confidence that the attribute belongs to a class or the like. An input attribute vector, x=(x1, x2, x3, x4, xn) may be mapped to f(x)=confidence(class). Such classification can employ a probabilistic and/or statistical based analysis (e.g., factoring into the user's history of object retrieval, global histories for other users retrieving similar object s, external parameters, or the like) to infer an action that a user desires to be retrieve, store, move, or otherwise utilize an object. In various embodiments, systems and methods may utilize other directed and undirected model classification approaches include, e.g., naïve Bayes, Bayesian networks, decision trees, neural networks, fuzzy logic models, and probabilistic classification models providing different patterns of independence. Classification may also include statistical regression that is utilized to develop weighted models. In examples, the robot 142 may weigh a user's history and weather greater than other factors for certain items. In other examples, the robot 142 may weigh different (non-weather) parameters more heavily. It is noted that factors may be given weights based on a type or identification of an object (e.g., electronic device, camera, clothing, keepsakes, decorations, etc.).

The under-stair storage system 100 may allow a user to visualize objects, object location, open or available space in the space 120, or the like. Visualization may include rending images, text, captured images, or the like of objects on a display device of a user device. In other embodiments, the stairs 112 may include display devices, lights, or the like to indicate contents.

In some embodiments, the under-stair storage system 100 may transfer an object from a bottom of the stairs 112 to a top of the stairs 112 without storing the object. For instance, a user may not be able to carry an object safely up or down the stairs. The user may provide input requesting the under-stair storage system 100 to receive the object from one end of the stairs 112 and transfer the object to another end of the stairs.

Figure 2:
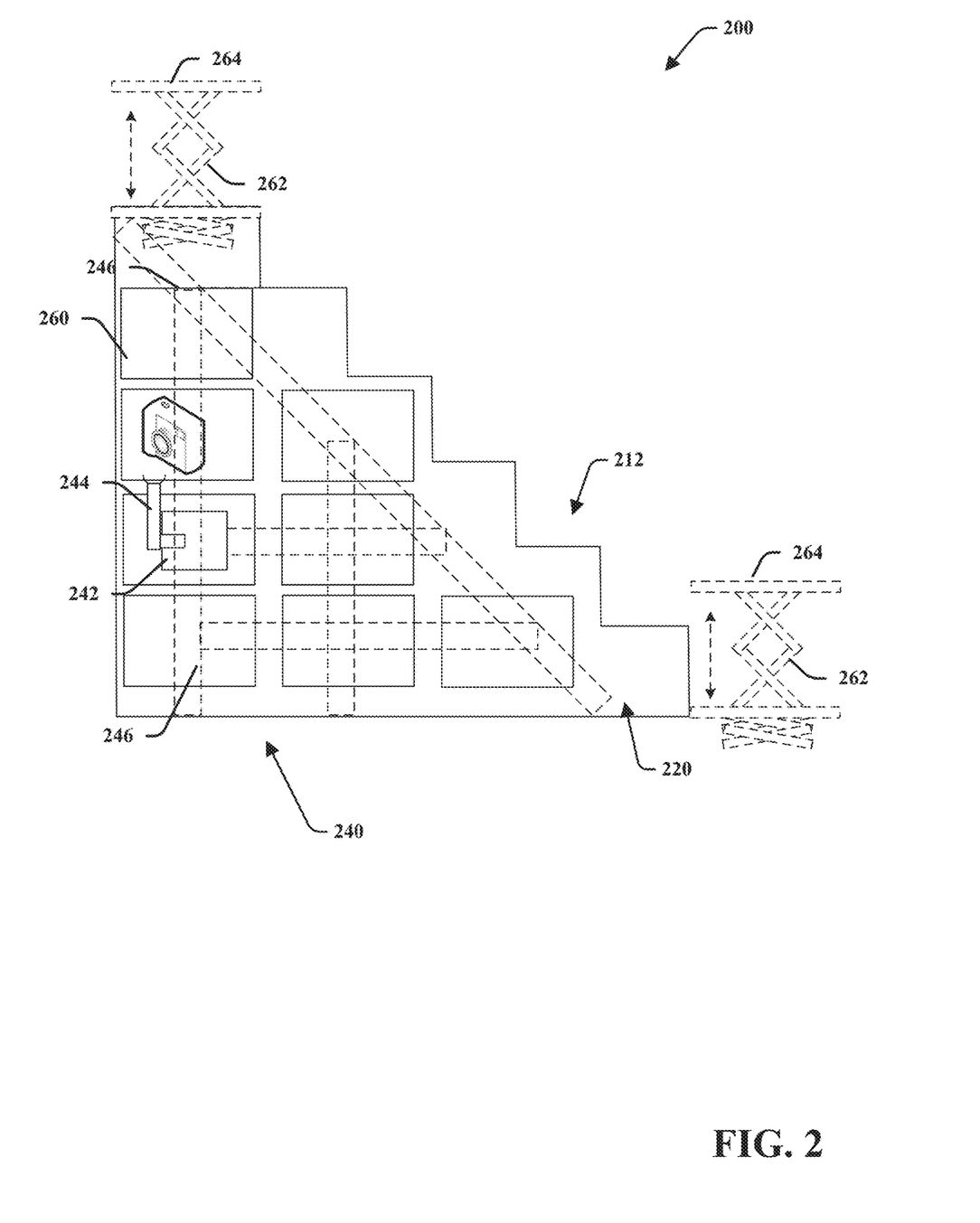
FIG. 2 depicts an under-stair storage system with a track under a set of stairs according to one or more embodiments described and illustrated herein.

Turning now to FIG. 2, there is an under-stair storage system 200 with a track under a set of stairs. The under-stair storage system 200 may include a robotic retrieval system 240 that may operatively retrieve or store objects from a space 220. The space 220 may be defined by stairs 212. Objects may be received at a portal within the upper floor 222. It is noted that like named components of FIG. 2 and FIG. 1 may comprise similar aspects. For instance, robot 242 and robot 142 may comprise similar aspects.

The robotic retrieval system 240 may include a robot 242 that may comprise an arm 244, similar to that of robot 142. The robot 142 may navigate track 246, which may be disposed beneath the stairs 212. In an aspect, the track 246 may allow the robot 242 to navigate to a plurality of shelves 260. The shelves 260 may be located under the stairs 212. It is noted that the number, size, shape, and other parameters of the shelves 260 may vary depending on the size and dimensions of the space 220.

The robot 242 may receive objects or deliver objects at a portal through the stairs 212 as described herein. In an example, the portal may provide access to or include one or more platforms 264 positioned at a top or bottom of the stairs. In some embodiments, the platforms 264 may be raised or lowered via a lifting mechanism 262 may comprise various appropriate constructions, such as telescoping poles, chains, pulleys, a scissor lift, or the like. This may allow a user to receive an object or place an object on the platform 264 without bending over. The platforms 264 may be lowered when not in use. In some examples, the platforms 264 may serve as gates to prevent a user from walking on the stairs when an object is being retrieved.

Figure 3:
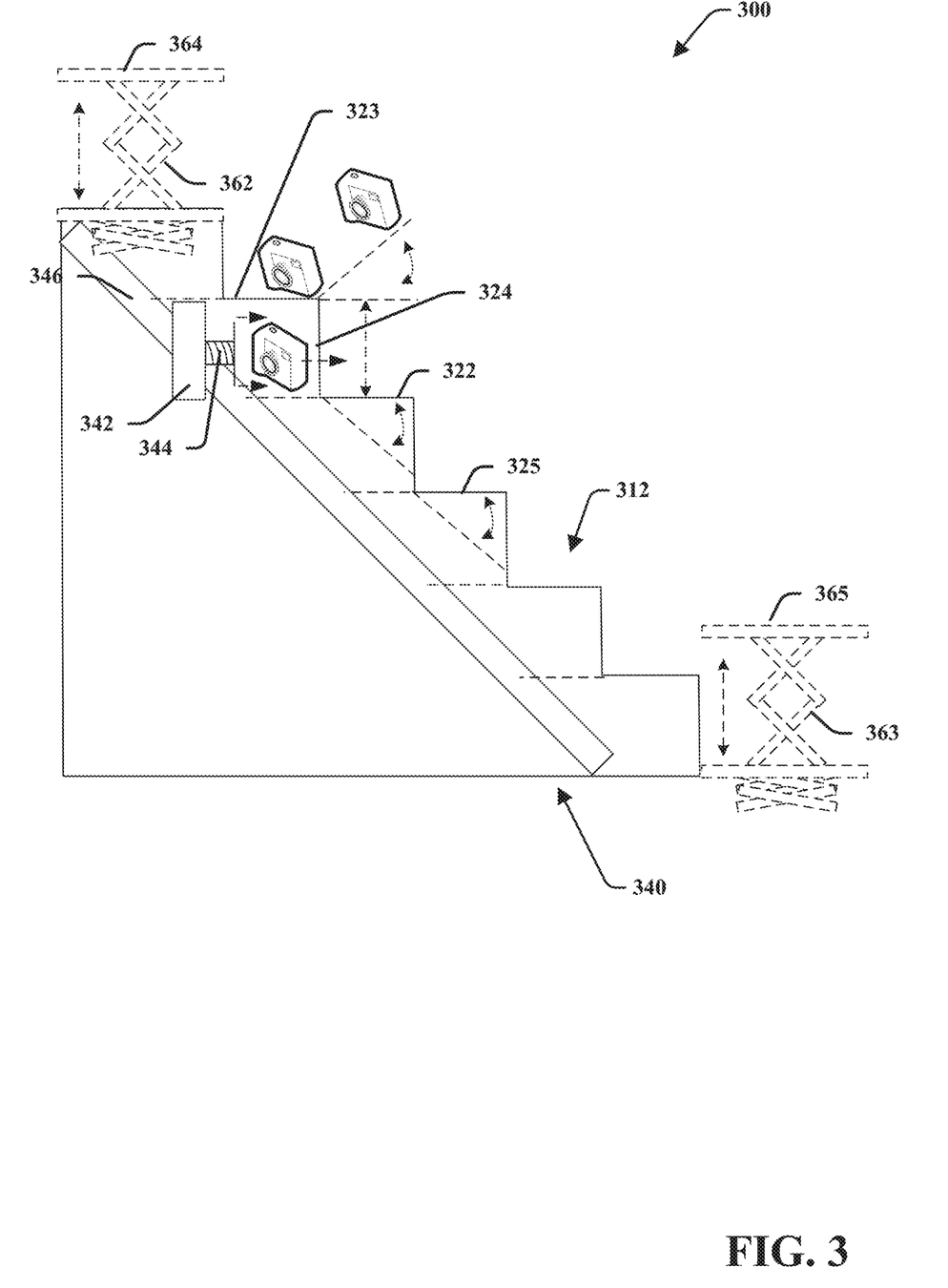
FIG. 3 depicts an under-stair storage system including a movable set of stairs according to one or more embodiments described and illustrated herein.

FIG. 3 depicts an under-stair storage system 300 including movable stairs 312 for object transportation. The under-stair storage system 300 may include a robotic retrieval system 340 that may primarily include a robot 342 including an arm 344, and a track 346. The robot 342 may navigate the track 346 to interact with an object for storage and/or retrieval. It is noted that liked name components of under-stair storage system 300 and other described systems (e.g., 100, 200) may comprise similar aspects.

In embodiments, objects may be stored under stairs 312. The objects may be stored under horizontal surfaces 322 and/or behind vertical surfaces 324. In some examples, the objects may be stored on a shelf, platform, bin, or the like.

When a stored object is identified as a target object for retrieval, the robot 342 may navigate to a position proximal the object. A vertical surface 324 adjacent to the object may open (e.g., retract, swing, etc.) to provide access to the object. The robot 342 may utilize arm 344 to move the object onto an adjacent horizontal surface 322. The vertical surface 324 may close once the object is cleared.

In some embodiments, the robotic retrieval system 340 may determine to provide the object at a top or a bottom of the stairs 312. The determination may be made based on user input, a sensor identifying the location of the user, machine learning, or the like. If the object is to be delivered at a top of the stairs, the horizontal surface 322 may be raised until it is substantially planar with a stair of an above horizontal surface 323. The horizontal surface 322 may be raised by a lifting mechanism, the robot 342, or the like. The horizontal surface 322 may be tilted such that the objects slides onto the above horizontal surface 323. This process may be continued until the object reaches a platform 364. The platform 364 may be raised via a lifting mechanism 362 such that a user does not need to bend over to receive the object.

When the object is to be provided at a bottom of the stairs 312, the horizontal surface 322 may be tilted downwards. The object may slide to a lower horizontal surface 325. The vertical surfaces 324 may be retracted to make room for the horizontal surfaces 322 to be tilted. The horizontal surface 322 may be lowered by a lifting mechanism, the robot 342, or the like. This process may be continued until the object reaches a platform 364. The platform 365 may be raised via a lifting mechanism 363 such that a user does not need to bend over to receive the object.

It is noted that embodiments may include a plurality of robots 342. In some examples, the robots 342 may be operatively connected to a track 346. In other embodiments, the robots 342 may be in a fixed position such that each stair of the stairs 312 that stores an object may be associated with its own robot 342.

Figure 4:
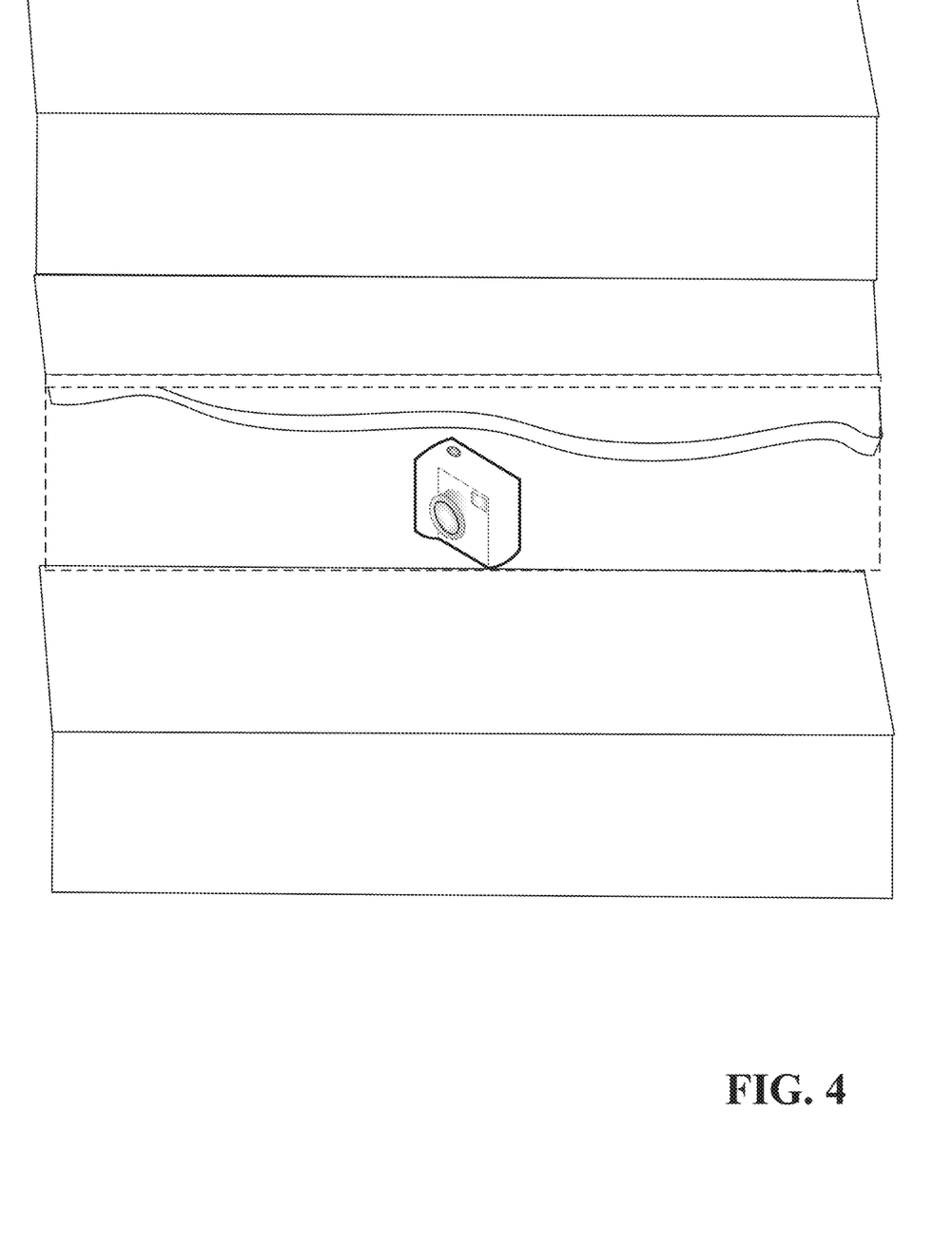
FIG. 4 depicts a portal for an under-stair storage system according to one or more embodiments described and illustrated herein.

FIG. 4 depicts an exemplary portal 460 for an under-stair storage system. The portal 460 may operatively receive an object and transport the object to or from an under-stair space (e.g., space 120, 220, 320, etc.). The portal 460 may comprise a door 466 and a platform 468. In some embodiments, portal may comprise a lifting mechanism as described herein. The lifting mechanism, door 466, and/or platform 468 may be powered by a motor and/or by manual power (e.g., user power). In some embodiments, a manual crank or other actuator may be provided to serve as backup in the event of a power failure.

In embodiments, a user may call or request the portal 460 to open or otherwise prepare to receive an object. The portal 460 may open the door 466. The door 466 may comprise a vertical or horizontal surface of a set of stairs 422. In some embodiments, an object may be moved through the door 466 by a robot. The object may be received by a user or otherwise delivered to a desired location. In some embodiments, the portal 460 may detect the presence of an object and may lower the platform 464 without requiring user instruction. For instance, the portal 460 may include weight sensors, proximity sensors, or the like that may detect the presence of the object. It is noted that the portal 460 may comprise other or different constructions. For instance, the door 466 may be formed in a wall, a banister, or the like.

When a user desires to store an object, the portal 460 may receive an object at the platform 464. The portal 460 may open the door 466. In some embodiments, a robot may navigate to the platform to retrieve the object. In other embodiments, the object may be lifted, lowered, or otherwise moved such that it may be passed through the door 466. In some embodiments, the object may be disposed within a bin and the robot may grasp the bin and deliver the bin to a location. Likewise, the robot may retrieve an object and place it on the platform 464. The platform 464 may be raised to deliver the object to a user.

According to embodiments, the portal 460 may include security monitoring components that may determine whether to disable opening the portal 460. In examples, the portal 460 may include proximity sensors, image capturing devices, weight sensors (e.g., scales), infrared sensors, or the like. If an object is detected on the portion 428 or within a threshold distance of the portion 428 while the portion 428 is flush with the upper floor (e.g., in a resting position such that the space 420 is not accessible), the portal 460 may be disabled from opening. For instance, if a user is standing on the portion 428 and attempts to open the portal 460 to deposit or retrieve an object, the portal 460 may disable opening. In some examples, an under-stair storage system may generate an alert to a user as a visual alert, audible alert, or a tactile alert. For instance, a system may send an alert to a user device to vibrate, display a warning, produce an audible signal, or the like. In some embodiments, the portion 428 may include one or more audio devices (e.g., speakers) or optical devices (e.g., display screen, lights, etc.), In some embodiments, the portal 460 may detect biological life placed thereon and may disable movement in response to detecting biological life. In examples, a child or a pet may be disposed on the platform. The portal 460 may include sensors to detect movement, detect temperature (e.g., body temperature), detect images (e.g., recognize animals), or the like. This may prevent children from playing with the portal 460 or from accidents that may cause harm to humans or animals.

Figure 5:
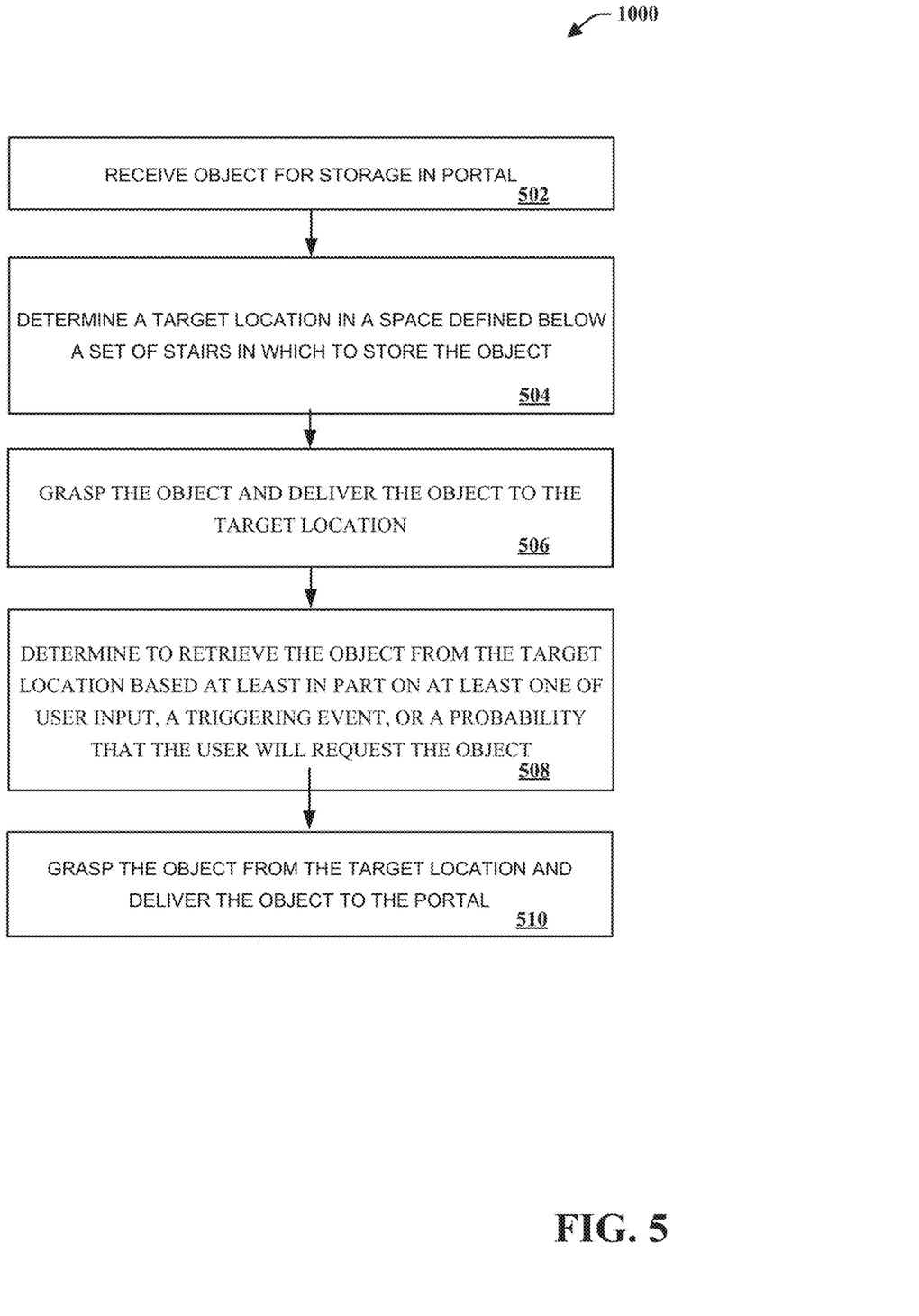
FIG. 5 depicts a method for an under-stair storage system according to one or more embodiments described and illustrated herein.

In view of the subject matter described herein, methods that may be related to various embodiments may be better appreciated with reference to the flowcharts of FIG. 5 While the methods are shown and described as a series of blocks, it is noted that associated methods or processes are not limited by the order of the blocks. It is further noted that some blocks and corresponding actions may occur in different orders or concurrently with other blocks. Moreover, different blocks or actions may be utilized to implement the methods described hereinafter. Various actions may be completed by one or more of users, mechanical machines, automated assembly machines (e.g., including one or more processors or computing devices), or the like.

FIG. 5 depicts an exemplary flowchart of non-limiting method 500 associated with under-stair storage systems and methods for storing items under a set of stairs, according to various aspects of the subject disclosure. As an example, method 500 may store objects in a target location under a floor and may retrieve objects from the target location.

At 502, a system, such as under-stair storage system 100, may receive an object for storage in a portal. The object may be appropriately sized to fit within a space under a set of stairs. In embodiments, receiving an object may include receiving a physical object, receiving input from a user identifying the object, utilizing sensors to detect the object or parameters of the object (e.g., weight, dimensions, identity, etc.).

At 504, a system may determine a target location in a space defined below a set of stairs in which to store the object. Determining the target location in the space may comprise identifying available locations, determining in which locations the object will fit, and identifying a location as a target location. In some embodiments, the method 500 may identify a location as the target location based on proximity to a portal and frequency of retrieval and storage of the object. For instance, the method 500 may determine a target location closest to the portal for objects retrieved and stored more frequently than other objects. In some embodiments, the method 500 may reorder or relocate stored objects to make room for the object to be stored. For instance if the only location that may receive the object is already utilized, the method 500 may relocate stored objects to clear the location. In at least some embodiments, the method 500 may relocate objects during non-active periods (e.g., when the user is not storing or retrieving objects). This may allow the method 500 to store an object and later increase space utilization in non-active periods. Relocating objects during non-active periods may reduce the wait time for a user during storage or retrieval of objects.

At 506, a system may grasp the object and delivering the object to the target location. In embodiments, the portal may deliver the object to a robot or a robot may otherwise grasp an object from the portal. The robot may then deliver the object to the target location as described herein. It is noted that the object may be within a bin.

At 508, a system may determine to retrieve the object from the target location based at least in part on at least one of user input, a triggering event, or a probability that the user will request the object. The user input may be received from a computing device, voice command, or the like.

At 510, grasping system may grasp the object from the target location_ and delivering e object to the portal. The portal may then deliver the object to the user.

Figure 6:
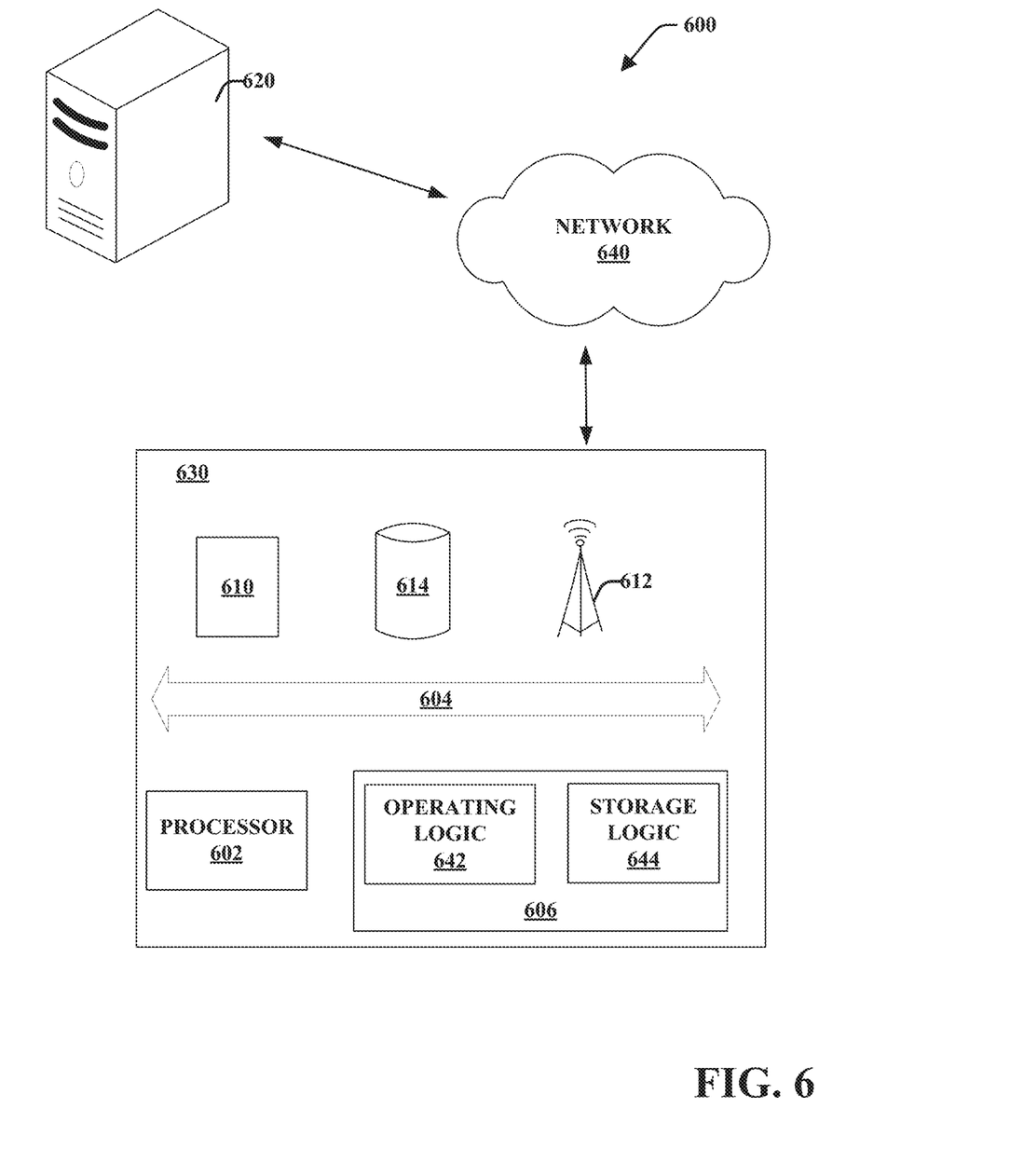
FIG. 6 schematically illustrates an example computing system for an under-stair storage system and method according to one or more embodiments described and illustrated herein.

FIG. 6 depicts an example computing system 600 for performing the functionalities as described herein. In some embodiments, the computing system 600 may include an under-stair storage system (e.g., 100, 200, 300, etc.) comprising a computing device 630. The example computing device 630 of the computing system 600 includes one or more processors 602, a communication path 604, one or more memory devices 606, one or more sensors 610, network interface hardware 612, and a data storage device 614, the details of which will be set forth in the following paragraphs. It should be understood that the computing system 600 of FIG. 6 is provided for illustrative purposes only, and that other computing systems comprising more, fewer, or different components may be utilized. It is further noted that components of the computing system 600 may be comprised within a single device or distributed among devices. For instance, portions of computing device 630 may reside within a robot, robotic retrieval system, user computing device, or the like.

Each of the one or more processors 602 may be any device capable of executing computer readable and executable instructions. Accordingly, each of the one or more processors 602 may be a controller, an integrated circuit, a microchip, a computer, or any other computing device. The one or more processors 602 are coupled to a communication path 604 that provides signal interconnectivity between various modules of the computing system 600. Accordingly, the communication path 604 may communicatively couple any number of processors 6 with one another, and allow the modules coupled to the communication path 604 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 604 may be formed from any medium that is capable of transmitting a signal such as, for example, conductive wires, conductive traces, optical waveguides, or the like. In some embodiments, the communication path 604 may facilitate the transmission of wireless signals, such as WiFi, Bluetooth®, Near Field Communication (NFC) and the like. Moreover, the communication path 604 may be formed from a combination of mediums capable of transmitting signals. In one embodiment, the communication path 604 comprises a combination of conductive traces, conductive wires, connectors, and buses that cooperate to permit the transmission of electrical data signals to components such as processors, memories, sensors, input devices, output devices, and communication devices. Accordingly, the communication path 604 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The computing system 600 includes one or more memory devices 606 coupled to the communication path 604. The one or more memory devices 606 may comprise RAM, ROM, flash memories, hard drives, or any device capable of storing computer readable and executable instructions such that the computer readable and executable instructions can be accessed by the one or more processors 602. The computer readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into computer readable and executable instructions and stored on the one or more memory modules 406, Alternatively, the computer readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The one or more memory devices 606 may be configured as volatile and/or nonvolatile memory and, as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. The one or more memory devices 606 include logic in the form of computer readable instructions that perform the functionalities described herein. The one or more memory devices 606 may be configured to store operating logic 642 and storage logic 644 (each of which may be embodied as a computer program. (i.e., computer readable instructions), firmware, or hardware, as an example), The operating logic 642 may include an operating system and/or other software for managing components of the computing device 630. In another aspect, the storage logic 644 may reside in the memory devices 606 and may be configured to facilitate storage, retrieval, or management of objects stored under a set of stairs. The storage logic 644 may be configured to instruct a robotic retrieval system to retrieve objects in response to user input, in response to a triggering event, predictively, or the like. The storage logic 644 may be configured to provide other aspects disclosed herein.

The data storage device 614, which may generally be a storage medium, may contain one or more data repositories for storing data that is received and/or generated, and may be any physical storage medium, including, but not limited to, a hard disk drive (HDD), memory, removable storage, and/or the like. While the data storage device 614 is depicted as a local device, it should be understood that the data storage device 614 may be a remote storage device, such as, for example, a server computing device or the like. In some embodiments, the data storage device stores map information, such as the high-definition map data described above. It should be understood that the data storage device is not provided in some embodiments.

Still referring to FIG. 6, the computing system 600 may comprise network interface hardware 612 for communicatively coupling the computing system 600 to a remote computing device 620, such as, without limitation, an under-stairs storage system or robotic retrieval system and/or a remote server. The network interface hardware 612 can be communicatively coupled to the communication path 604 and can be any device capable of transmitting and/or receiving data via a network 640. Accordingly, the network interface hardware 612 can include a communication transceiver for sending and/or receiving wireless communications. For example, the network interface hardware 612 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 612 includes hardware configured to operate in accordance with the Bluetooth® wireless communication protocol.

It should now be understood that embodiments of the present disclosure are directed to systems and methods for controlling a vehicle with respect to an intersection to avoid a zone of interest, such as a dilemma zone or an optional zone. Embodiments predict a zone of interest in advance of the vehicle arriving at the intersection and control the velocity of the vehicle when the vehicle is predicted to be within the zone of interest. Thus, drivers and autonomous vehicles will avoid a dilemma zone situation where the vehicle cannot proceed through the intersection before the traffic light turns red nor stop at the stop line, and avoid an optional zone where a driver may hesitate in deciding whether to drive through the intersection or stop at the stop line.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A system for under-stair storage, comprising:
a portal comprising a platform configured to receive one or more objects, wherein the portal operatively provides access to a space defined under a set of stairs;
a robotic retrieval system comprising a robot, wherein the robot includes an arm for grasping the one or more objects, and wherein the robot is configured to:
retrieve the one or more objects from one or more locations within the space;
deposit the one or more objects in the one or more locations within the space;
in response to user input requesting storage of a target object from the one or more objects, determine a target location in which to deposit the target object; and
store the target location and an identifier that identifies the target object in memory.

2. The system of claim 1, wherein the robotic retrieval system further comprises a track disposed under the set of stairs, wherein the robot operatively transverses the track to retrieve or deposit the one or more objects.

3. The system of claim 1, wherein the robotic retrieval system further comprises a track disposed above the set of stairs, wherein the robot operatively transverses the track to retrieve or deposit the one or more objects.

4. The system of claim 1, wherein the robot includes at least one image capturing device that operatively determines an identification of the one or more objects based on at least one of an image of the one or more objects or an identification token located on the one or more objects.

5. The system of claim 1, wherein the robotic retrieval system determines whether to retrieve an object from the one or more objects in response to a user request.

6. The system of claim 1, wherein the robotic retrieval system determines whether to retrieve air object from the one or more objects in response to a triggering event.

7. The system of claim 1, wherein the robotic retrieval system determines the target location in which to deposit the target object based at least in part on dimensions of the target object and dimensions of the target location.

8. The system of claim 6, wherein the robotic retrieval system further determines the target location in which to deposit the target object based further in part on dimensions of one or more pathways formed within the space.

9. The system of claim 1, wherein the robotic retrieval system determines the target location in which to deposit the target object based at least in part on a frequency of retrieval and storage of the target object and proximity of the target location to the portal.

10. The system of claim 1, wherein the robotic retrieval system further includes at least one display device that generates notifications identifying the one or more objects stored within the space.

11. The system of claim 1, wherein the robotic retrieval system further includes a charging station, and wherein the robot includes a rechargeable battery that is operatively recharged by the charging station.

12. A method comprising:
receiving an object at a portal for storage under a set of stairs;
determining a target location in a space defined below the set of stairs in which to store the object;
grasping, by a robotic retrieval system, the object from the portal;
delivering the object to the target location in the space.

13. The method of claim 12, further comprising
receiving user input requesting retrieval of the object; and
in response to the user input, retrieving the object from the target location.

14. The method of claim 12, further comprising:
detecting a triggering event; and
in response to detecting the triggering event, retrieving the object from the target location.

15. The method of claim 14, wherein the triggering event comprises at least one of a weather parameter meeting a criteria, an event, a holiday, or an alarm.

16. The method of claim 12, further comprising:
calculating a probability of that a user will request retrieval of the object based on a weighted model of a history associated with the user; and
in response to the probability meeting a threshold probability, retrieving the object from the target location.

17. A system for under-stair storage, comprising:
a portal comprising a platform configured to receive one or more objects;
a robotic retrieval system comprising a track disposed beneath a set of stairs, and a robot operatively connected to the track and configured to traverse the track to retrieve or deposit one or more objects within a space below the set of stairs, and
wherein the robot includes an arm for moving the one or more objects in desired locations.

18. The system of claim 17, wherein the set of stairs includes one or more of horizontal surfaces and one or more of vertical surfaces, and wherein the one or more horizontal surfaces are movable to raise or lower an object onto an adjacent one or more horizontal surface.

19. The system of claim 18, wherein the one or more vertical surfaces are movable to open or close to allow access to the space or allow the one or more horizontal surfaces to move raise or lower.

20. The system of claim 19, wherein the portal includes a lifting mechanism and a platform configured to receive an object.

* * * * *